(12) United States Patent
Spratte et al.

(10) Patent No.: US 10,690,235 B2
(45) Date of Patent: Jun. 23, 2020

(54) FASTENING DEVICE, SELECTOR LEVEL HOUSING, FORCE TRANSMISSION ELEMENT, SWITCHING DEVICE AND METHOD FOR FASTENING A SWITCHING DEVICE

(71) Applicant: ZF Friedrichshafen AG, Friedrichshafen (DE)

(72) Inventors: Joachim Spratte, Osnabrueck (DE); Andreas Salum, Bodenwerder (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 724 days.

(21) Appl. No.: 15/027,887

(22) PCT Filed: Sep. 10, 2014

(86) PCT No.: PCT/EP2014/069244
§ 371 (c)(1),
(2) Date: Apr. 7, 2016

(87) PCT Pub. No.: WO2015/051962
PCT Pub. Date: Apr. 16, 2015

(65) Prior Publication Data
US 2017/0023128 A1 Jan. 26, 2017

(30) Foreign Application Priority Data

Oct. 10, 2013 (DE) .................. 10 2013 220 409

(51) Int. Cl.
*F16H 59/10* (2006.01)
*F16H 61/22* (2006.01)
(Continued)

(52) U.S. Cl.
CPC ............. *F16H 59/10* (2013.01); *F16H 59/02* (2013.01); *F16H 61/22* (2013.01); *F16H 61/36* (2013.01);
(Continued)

(58) Field of Classification Search
CPC .......... F16H 59/10; F16H 61/22; F16H 61/36; F16H 59/105; F16H 2059/026; B60Y 2306/09
See application file for complete search history.

(56) References Cited

U.S. PATENT DOCUMENTS 5,899,115 A * 5/1999 Kataumi ............. F16H 59/0204
74/473.12
5,949,041 A * 9/1999 Sakairi .................. F16H 59/105
200/61.88
(Continued)

FOREIGN PATENT DOCUMENTS

DE 2 037 310 A1 4/1971
DE 2037310 A1 * 4/1971 ............. B60K 20/04
(Continued)

OTHER PUBLICATIONS

German Search Report dated Jul. 21, 2014 for German Patent Application No. DE 10 2013 220 409.4 (German language) (8 pp.).
(Continued)

*Primary Examiner* — Zakaria Elahmadi
(74) *Attorney, Agent, or Firm* — Brinks Gilson & Lione (57) ABSTRACT

The present invention relates to an attachment mechanism, a gearshift lever housing, a force transmitting element, a shift device, and a method for attaching a shift device, which reduce a system noise that is transmitted from an engine compartment into a motor vehicle interior space. The attachment mechanism comprises an aperture for receiving the gearshift lever device, a bearing surface section at least
(Continued)

partially encompassing the aperture, for bearing on a bearing element, a sealant receiver disposed in the bearing surface section, and a mount for supporting a section of a force transmitting device, by means of which the gearshift lever device can be connected to a motor vehicle transmission device in a shift-effecting manner, wherein the mount is disposed on a side of the bearing surface section facing away from the sealant receiver. The attachment mechanism is distinguished in that the sealant receiver is disposed such that it at least partially overlaps a support region delimited by the mount in terms of its cross section.

8 Claims, 6 Drawing Sheets

(51) Int. Cl.
    *F16H 61/36*     (2006.01)
    *F16H 59/02*     (2006.01)

(52) U.S. Cl.
    CPC ......... *B60Y 2306/09* (2013.01); *F16H 59/105* (2013.01); *F16H 2059/026* (2013.01); *F16H 2059/0269* (2013.01)

(56) References Cited

U.S. PATENT DOCUMENTS

| | | | | |
|---|---|---|---|---|
| 6,164,160 | A * | 12/2000 | Nassar | F16H 61/0009<br>29/840 |
| 6,295,886 | B1 * | 10/2001 | Russell | F16H 59/0204<br>74/473.18 |
| 2004/0255712 | A1 * | 12/2004 | Ruhlander | F16C 1/102<br>74/502.4 |
| 2009/0120231 | A1 * | 5/2009 | Ruhlander | F16C 1/105<br>74/502.4 |
| 2009/0139362 | A1 * | 6/2009 | Ito | F16H 61/32<br>74/473.12 |
| 2015/0027865 | A1 * | 1/2015 | Inotsuka | F16H 59/105<br>200/61.88 |
| 2015/0143938 | A1 * | 5/2015 | Swaita | F16H 61/22<br>74/473.12 |
| 2017/0175880 | A1 * | 6/2017 | Beattie | F16H 59/105 |

FOREIGN PATENT DOCUMENTS

| | | |
|---|---|---|
| DE | 10 2007 021 834 A1 | 6/2006 |
| DE | 603 03 494 T2 | 9/2006 |
| DE | 10 2004 056 777 A1 | 11/2008 |
| DE | 10 2008 032 202 A1 | 1/2010 |
| EP | 0 667 470 A2 | 8/1995 |
| EP | 2 453 148 A2 | 5/2012 |

OTHER PUBLICATIONS

Translation of p. 8 of German Search Report dated Jul. 21, 2014 for German Patent Application No. 10 2013 220 409.4 (2 pages).
International Search Report and Written Opinion dated Oct. 6, 2015 for PCT/EP2014/069244 (German language, 13 pages).
International Search Report dated Oct. 6, 2015 for PCT/EP2014/069244 (English language, 2 pages).

\* cited by examiner

FASTENING DEVICE, SELECTOR LEVEL HOUSING, FORCE TRANSMISSION ELEMENT, SWITCHING DEVICE AND METHOD FOR FASTENING A SWITCHING DEVICE

RELATED APPLICATIONS

This application is a filing under 35 U.S.C. § 371 of International Patent Application PCT/EP2014/069244, filed on Sept. 10, 2014, and claims the priority of German Patent Application DE 10 2013 220 409.4, filed Oct. 10, 2013, both of which are incorporated by reference herein in their entirety.

BACKGROUND

1. Technical Field

The present invention relates to an attachment mechanism for a gearshift lever device for a motor vehicle transmission shift device, a gearshift lever housing for such a gearshift lever device, a force transmitting element for such a gearshift lever device, a shift device for a motor vehicle transmission, and a method for attaching a shift device to a motor vehicle component.

2. Background Information

A gearshift lever device for a motor vehicle transmission device normally comprises a selection or shift lever that can pivot about a selection and/or shift axis, by means of which a drive position selected by a motor vehicle driver is transmitted to a motor vehicle transmission. The gearshift lever can be moved thereby into one or more shift gates for selecting a drive position. For this, the gearshift lever is supported, by way of example, via a ball joint, or crossed axles in a gearshift lever housing assigned to the gearshift lever device.

In order to transmit the drive position selected with the gearshift lever, mechanical elements are normally disposed between the gearshift lever and the motor vehicle transmission device, which can be an automatic transmission, in order to shift to the shifting program in an automatic transmission corresponding to the drive position (P, N, R, D, S). Normally a cable pull, a Bowden cable or a mechanical rod is used for the mechanical elements of such a force transmitting device. The force transmitting device can be attached directly to a free end of the gearshift lever or to a free end of a force transmitting element disposed between the force transmitting device and the free end of the gearshift lever.

A gearshift lever device of this type is normally attached to a motor vehicle component, e.g. a body part of a motor vehicle, such as a motor vehicle floor plate, via an attachment mechanism. In order to seal a motor vehicle interior space against an exterior space of the motor vehicle, separated therefrom by means of the floor plate, a sealant is used, as is already known, between the motor vehicle component and the attachment mechanism.

A shift device comprising a gearshift device as described above, which can be attached to a motor vehicle component via an attachment mechanism, is known, for example, from EP 0 667 470 A2. The attachment mechanism as well as the gearshift lever housing are made from a material containing plastic. The force transmitting device is realized by means of a cable pull, comprising a cable pull core, a cable pull casing encasing the cable pull core, and a cable pull counter bearing, connected to the cable pull casing in an end section of the cable pull device, wherein the cable pull counter bearing is attached to a front surface end of the attachment mechanism, in order to enable a relative movement of the cable pull core in relation to the cable pull casing. The cable pull core is attached at its other end to an actuator of the motor vehicle transmission device, in order to transmit a selected drive position to the actuator. For this, the cable pull casing is also connected to a housing of the motor vehicle transmission device by means of a cable pull counter bearing. The connection of the cable pull casing, with the one end to the housing of the motor vehicle transmission device, and with the other end to the attachment mechanism, enables a conveyance of assembly noises from the engine compartment into the passenger compartment, which is regarded as unpleasant by a motor vehicle driver. Normally, such background noises are damped via a damping element disposed in the force transmitting device, but the background noises are reinforced, in turn, by the design of the attachment mechanism, as well as the gearshift lever housing of the gearshift lever device made of a material containing plastic, because these components function as diaphragms.

BRIEF SUMMARY OF THE INVENTION

According to a first aspect of the present invention, an improved attachment mechanism for a gearshift lever device, in particular for a shift device of a motor vehicle transmission, e.g. an automatic unit or an automatic transmission, is to be provided by the present invention. According to another aspect of the present invention, an improved force transmitting element for such a gearshift lever device is proposed, as well as, according to another aspect of the present invention, an improved gearshift lever housing for such a gearshift lever device. According to a further aspect of the present invention, an improved shift device for a motor vehicle transmission, in particular for an automatic unit or an automatic transmission, is proposed, as well as a method for attaching a shift device to a motor vehicle component. In particular, with the aforementioned aspects of the present invention, a reduction of the background noises conveyed from the engine compartment into the motor vehicle interior space is obtained.

The attachment mechanism pertaining to the first aspect of the present invention, having the features of claim 1, comprises an aperture for receiving the gearshift lever device. The aperture is preferably selected in terms of its dimensions, such that a free end of the gearshift lever device, in particular a gearshift lever housing of the gearshift lever device, can be accommodated by the aperture. The free end of the gearshift lever device, or the gearshift lever housing, respectively, preferably corresponds to an end section of the gearshift lever device, or the gearshift lever housing, respectively, which faces away from the gearshift lever device, or the gearshift lever housing, through which a gearshift lever supported on the gearshift lever device, or received in the gearshift lever housing, respectively, extends. The gearshift lever device can preferably be attached to the attachment mechanism by means of a clamping, latching, or screw connection, wherein the attachment mechanism as well as the gearshift lever device may have appropriate, or corresponding attachment elements. Because these pertain to typical attachment measures for attaching two components, this shall not be explained in greater herein.

The aperture is at least partially encompassed by a bearing surface section that bears on a bearing element. The aperture is preferably at least partially delimited by an edge assigned to the bearing surface section. The bearing surface section is designed for bearing on a motor vehicle component, or on a body component of a motor vehicle. By way of example, the bearing element can be a floor plate of a motor vehicle. The bearing surface section can preferably be flat, arched, or curved. The bearing surface section can, more preferably, have any conceivable shape adapted to the shape of the corresponding bearing element. As a result of the different possible designs for the bearing surface section, an attachment to specific motor vehicles can be provided for different motor vehicles, which have a differently designed bearing element, on which the attachment mechanism is to be assigned to, or attached to, the gearshift lever device.

Furthermore, a sealant receiver is disposed in the bearing surface section. The sealant receiver is preferably designed such that a sealant can be disposed between the bearing element and the gearshift lever device receiver, or the attachment mechanism, respectively, for sealing a motor vehicle interior space against an external edge delimited by the bearing element. As the sealant, preferably a material having at least one previously known sealant substance, e.g. containing a rubber, polyurethane, or poly-tetra-fluoro-ethylene sealant substance, may be considered. In general, the sealant can be made from a previously known material, which in general, can be disposed or provided between two components to form a seal.

The proposed attachment mechanism furthermore comprises a mount for supporting a section of a force transmitting device, by means of which the gearshift lever device can be connected to a motor vehicle transmission device, such that shifting can be effected. In other words, the force transmitting device is designed to transmit a drive position selected via the gearshift lever device to the motor vehicle transmission device, for engaging the selected drive position in the motor vehicle transmission device. The selectable drive positions are preferably one or more drive positions selected from at least one forwards drive position D, one reverse drive position R, one neutral setting N, and one park setting P. Further drive positions are certainly conceivable. Thus, the gearshift lever device can be designed as a shift-by-wire device, wherein at least the selectable drive positions D, R, and N are transmitted electrically to the motor vehicle transmission device, and the park drive position P is transmitted mechanically to the motor vehicle transmission device in a shift-effecting manner, via the force transmitting device. The force transmitting device is preferably a cable pull device, a Bowden cable device, or a mechanical rod, comprising one or more rod elements connected to one another in the direction of the action of force. Normally, such a force transmitting device, disposed between the gearshift lever device and the motor vehicle transmission device, has a casing element encasing the power transmitting element of the force transmitting device in order to protect or insulate it, wherein the casing element is secured in a stationary manner at a free end thereof on the attachment mechanism, and at the other end on the motor vehicle transmission device. The mount is designed, in particular, for supporting a section, in particular an end section, of such a casing element. By way of example, the end section of the casing element can be formed from a cable pull counter bearing, wherein the mount is preferably designed to support the cable pull counter bearing. The mount is disposed on a side of the bearing surface section facing away from the sealant receiver. As a result, the force transmitting device can be installed, advantageously, outside a sealing region lying between the bearing surface section and the bearing element, defined by the sealant.

The proposed attachment mechanism is distinguished in that the sealant receiver is disposed, in terms of its cross section, in part overlapping a support region delimited by the mount for supporting the section of the force transmitting device. In other words, an extension region of the sealing receiver, running parallel to a surface plane of the bearing surface section and the support region delimited by the mount, overlap one another in terms of their cross sections, at least partially, with a bearing surface section region being disposed therebetween. A support region as set forth in the present invention is a region delimited by the outer dimensions of the mount, wherein the mount can have one or more support sections. In the case of at least two support sections, the support region extends from an outer surface of the first support section to an outer surface of the second support section facing away from this outer surface. By disposing the sealant receiver inside the support region, it can be ensured that an oscillation transmitted to the attachment mechanism, normally at a coupling point between the force transmitting device and the attachment mechanism, can be simultaneously transmitted to the bearing element, by means of which the bearing element can act as a damper for the transmitted oscillation at the location of the oscillation transmission, which corresponds to the coupling point. It has proven to be the case that the oscillation supporting the background noises can be effectively reduced thereby, by means of which the background noise is likewise minimized.

The width of the sealant receiver is preferably less than the width of the support region running parallel thereto, by means of which the sealant receiver is disposed along the direction of the width inside the support region, with the bearing surface section disposed therebetween. As a result, the overall width of the sealant, that can be accommodated by the sealant receiver directly on the coupling point, can be exploited for transmitting the oscillation to the bearing element.

The sealant receiver can be a planar surface section of the bearing surface section, on which the sealant can be provided, and which lies in a plane with the bearing surface section, or in a plane parallel thereto. The sealant receiver can preferably be formed by a recess formed in the bearing surface section. In other words, the sealant receiver is provided, in particular, by a cavity formed as a groove recessed in the bearing surface section, into which the sealant can be placed, or injected. The sealant receiver can preferably have at least one rib or further depression running along the sealant receiver. As a result, a surface area of the sealant receiver is increased, by means of which a better adhesion of the sealant in the sealant receiver can be obtained.

According to a preferred embodiment of the present invention, the mount can be formed by two support sections spaced apart in the direction of the action of force for the force transmitting device. As a result, a possible torsion or twisting of the supported section of the force transmitting device about a single support axis can be counteracted in order to increase the stability of the mount. The support sections are preferably designed thereby, such that the supported section of the force transmitting device is supported in a clamping manner. Furthermore, more preferably, at least one clamping element interacting with the support section can be provided for securing the section of the force transmitting device to the mount.

According to a further preferred embodiment of the present invention, the attachment mechanism has at least one collar, which comprises or forms a part of the bearing surface section having the sealant receiver on a side with the collar, and supports the mount on a side of the collar facing away therefrom. In other words, the attachment mechanism has an excess in a predetermined width, thickness and depth, wherein the excess comprises or forms a part of the bearing surface section having the sealant receiver. As set forth in the invention, comprising implies, in this preferred embodiment, in particular, further elements, which form, on one hand, the bearing surface section, and on the other hand, the sealant receiver, and which can be disposed on the corresponding side of the collar, or the excess of the corresponding part of the bearing surface section, as well as forming the sealant receiver, thus, in other words, which can be designed as an integral part thereof. The mount can preferably be attached to the collar, or the excess, respectively, via typical attachment means. Alternatively, the mount can likewise be formed, in a preferred manner, as an integral part of the collar or excess, respectively. With an integral design of the mount, as well as the bearing surface section, with the collar or the excess, respectively, the attachment mechanism can be produced in a cost-effective and simple manner.

The attachment mechanism is preferably designed in the shape of a pan, wherein the aperture is provided in the pan-shaped section of the attachment mechanism, and the bearing surface section protrudes away from the pan-shaped section. The bearing surface section forms a collar or an excess, respectively, thereby.

According to a further preferred embodiment of the present invention, the attachment mechanism is made of a hard plastic component and a soft plastic component, in particular by means of a two-component injection molding process, wherein at least the mount is formed by the soft plastic component. As a result, an elastic mount is created, which can dampen the oscillations at the location of the mount conveyed via the supported section of the force transmitting device, by means of which the oscillation at the coupling point can be further reduced.

According to another aspect of the present invention, a gearshift lever housing for a gearshift lever device, as described above, is proposed, wherein the gearshift lever housing comprises a first gearshift lever housing part, and a second gearshift lever housing part, which can be attached to the first gearshift lever housing part. The first and second gearshift lever housing parts can thus be combined to form a gearshift lever housing. The gearshift lever housing parts preferably have attachment elements for this, e.g. clamping, latching or screw connection elements. Furthermore, at least one of the first and second gearshift lever housing parts has reinforcement ribs, which delimit from the rest of the gearshift lever housing region, a receiving space for receiving a linear, in particular, translational moving force transmitting element for transmitting a gearshift lever movement to a force transmitting device connected to a motor vehicle transmission device. The force transmitting device can be one such as that described above.

The gearshift lever housing is preferably produced from a material containing plastic by means of an injection molding process, in particular a two-component injection molding process. As a result, the production costs can be reduced.

The gearshift lever housing of the present invention is distinguished in that it has a mount for the stationary support of a blocking device that can be disposed in the movement path of the force transmitting element, which is provided for blocking a linear movement of the force transmitting device, wherein the mount has at least one support element, which is connected to at least one of the reinforcement ribs, and is provided for bearing on the blocking device. The bearing, or contact, respectively, of the gearshift lever housing to the massive blocking device via the support element, contains the advantage that the gearshift lever housing does not vibrate at the bearing, or contact location, by means of which, a diaphragm characteristic of the gearshift lever housing can be counteracted, in particular when it is made from a material containing plastic.

According to a preferred exemplary embodiment of the present invention, the mount has at least one second support element, which is disposed opposite of the at least first support element, wherein the first and second support elements are designed to support the blocking element in a clamping manner, with an intermediate layer therebetween. As a result, on one hand, a non-oscillating support of the blocking device in the gearshift lever housing can be obtained, and on the other hand, an enlargement of the contact surface of the gearshift lever housing with the blocking device can be achieved. The inertia of the blocking device acts accordingly on the gearshift lever housing in an oscillation reducing manner.

The at least one support element is preferably provided for bearing against a securing element connected to the blocking device for securing the blocking device in the gearshift lever housing. The securing element can be a securing plate element disposed on a front surface of the blocking device, for example, which bears against the at least one support element in the gearshift lever housing at its flat surface, and/or its edge surface, when the blocking element is accommodated therein. As a result, a larger bearing surface for the gearshift lever housing can be created, by means of which an improved oscillation stability of the gearshift lever housing can be obtained.

The gearshift lever housing preferably has at least one securing pin protruding from an inner surface of a gearshift lever housing part, for engaging in a securing hole formed with the blocking device, in particular the securing plate element, assigned thereto. As a result, on one hand, the blocking device can be reliably retained in the gearshift lever housing, and on the other hand, a further improvement of the oscillation stability for the relevant gearshift lever housing part is obtained.

According to a preferred embodiment, at least one of the gearshift lever housing parts has at least one perforation in a wall region of the gearshift lever housing identified as the oscillation diaphragm. A wall region of this type corresponds, as set forth in the present invention, to a surface region of the gearshift lever housing, in which there are no reinforcement ribs or other elements that would form a stabilization of the wall surface. As a result, a diaphragm characteristic of the gearshift lever housing can be further reduced. Furthermore, the gearshift lever housing can be produced more economically through a saving on materials.

It is further preferred that the at least one perforation is formed at a spacing to the reinforcement ribs. In other words, the at least one perforation is separated from an adjacent reinforcement rib by a wall section of the gearshift lever housing. As a result, a stable structure of the gearshift lever housing is created in the region of the perforation and the adjacent reinforcement rib.

According to a further aspect of the present invention, an improved force transmitting element for a gearshift lever device is proposed, which comprises, in particular, a gearshift lever housing such as that described above. The force transmitting element designed for transmitting a drive position that can be selected via the gearshift lever to a motor vehicle transmission device. The force transmitting element has at least one guide element, which can be engaged with in a counter-guide element formed with the gearshift lever device, for guiding a linear movement of the force transmitting element in relation to the gearshift lever device. The guide element and the counter-guide element can be formed by a tongue and groove system. The tongue and groove system can be preferably designed such that the groove is formed in an element selected from the guide element and the counter-guide element, and the tongue can be formed in the other element selected from the guide element and the counter-guide element. Alternatively, both the guide element and the counter-guide element can have a groove and a tongue, which can engage in the corresponding counter-groove and counter-tongue of the respective other element assigned thereto, in order to form a linear, in particular translational, guidance of the movement of the force transmitting element.

The proposed force transmitting element further comprises a gearshift lever receiver for receiving a gearshift lever that imposes a movement on the force transmitting element. The gearshift lever receiver is preferably designed for receiving a gearshift lever section disposed between a gearshift lever support and a free end of the gearshift lever. As a result, the free end of the gearshift lever extending through the force transmitting element can be used for an engagement with a gearshift lever guide.

The force transmitting element furthermore comprises a receiver for a longitudinal end of a force transmitting device leading to a motor vehicle transmission device, for transmitting the movement imposed by the gearshift lever to the force transmitting device. The force transmitting device can be a force transmitting device such as that described above, by way of example, in particular a cable pull, a Bowden cable device, or a mechanical rod. In other words, the receiver is designed to retain a longitudinal end of the force transmitting device in relation to the force transmitting element in a stationary position. The receiver and the gearshift lever receiver are connected to one another by a frame, wherein the frame supports the at least one guide element. The gearshift lever receiver, the receiver, and the frame are preferably designed in an integral manner, and it is further preferred that they are formed from a material containing plastic. The force transmitting element can be injection molded, for example, by means of which the force transmitting element can be produced in a simple and cost-effective manner.

The frame has a recess between the gearshift lever receiver and the receiver for the longitudinal end, for a blocking device having at least one blocking element that can move at an angle to the linear movement of the force transmitting element, and at least one engagement element that at least partially encompasses the moving blocking element, for engaging in a gearshift lever housing of the gearshift lever device, wherein the recess enables a movement of the frame in relation to the blocking device. A blocking device of this type can preferably be an electromagnetic actuator, have a retractable and extendable pin. The recess is large enough that the force transmitting element can move linearly in the direction of the movement imposed by the gear shift lever, without bringing the blocking element with it. The recess preferably is large enough that the force transmitting element bears against the blocking device or the at least one engagement element when in end positions, which correspond to the end positions of the gearshift lever, and thus forms an end stop for the force transmitting element.

The frame furthermore has at least one blocking cavity that can be brought into engagement with the blocking element for blocking the linear movement of the force transmitting element. In other words, the frame has a cavity or an aperture in the region of the recess in a side facing the recess, which is designed to be able to be brought into engagement with the blocking element. The linear movement of the force transmitting element can be blocked by means of the engagement. By forming the cavity, or the aperture, at a predetermined position, which preferably corresponds to a gearshift lever position corresponding to a selected drive position, the gearshift lever can be locked, when the blocking element is in the engaged state with the cavity or aperture. The frame preferably has a blocking cavity for each selectable drive position, in order to enable an appropriate blocking of the force transmitting element, or the gearshift lever in a respective selected drive position.

The force transmitting element according to the present invention enables, in addition to the proximal arrangement of a massive blocking device, a simultaneous connection of the blocking device with the gearshift lever housing on the force transmitting device transmitting the oscillation from the engine compartment, by means of which the massive blocking device can act as a buffering mass. As a result, the oscillations and the transmitted background noises can be further reduced.

According to a preferred exemplary embodiment of the present invention, the gearshift lever receiver is shaped like an hour glass. In other words, the gearshift lever receiver has two opposing, funnel shaped cut-outs in a direction of the longitudinal axis of the gearshift lever, wherein the gearshift lever receiver has a smaller diameter in a central region, for receiving the gearshift lever section, than in an outer-more region of the gearshift lever receiver. It is further preferred that the central region is designed with a predetermined radius, i.e. in the manner of a segment of a circle in terms of the cross section, in a region that is in contact with the gearshift lever section. The hour-glass design of the gearshift lever receiver enables a continuous contacting of the gearshift lever section in each movement position thereof. This is particularly advantageous for a ball-joint or Cardan shaft-type bearing of the gearshift lever, as described above.

According to a further aspect of the present invention, a shift device for a motor vehicle transmission is proposed, wherein the shift device has a gearshift lever device with a gearshift lever, which is coupled directly, or via a force transmitting element that can be forced to move with the gearshift lever, to a force transmitting device, for transmitting the movement of the gearshift lever to the motor vehicle transmission. As set forth in this preferred embodiment, "directly" means that the gearshift lever is coupled to the force transmitting device, without the force transmitting element being disposed therebetween. The direct coupling of the gearshift lever to the force transmitting device does not exclude further components necessary for the coupling in this regard, or other advantageous components, from serving as the force transmitting element, by means of which, as set forth in the present invention, there is also a direct coupling of the gearshift lever to the force transmitting device. The force transmitting element, the force transmitting device and/or the gearshift lever device may be designed in the manner described above.

The proposed shift device also has an attachment mechanism, which is an attachment mechanism such as that describe above, for attaching the gearshift lever device to a motor vehicle component, wherein the attachment mechanism can be attached to the motor vehicle component with a sealant disposed therebetween. The shift device is distinguished in that the attachment mechanism has a mount for supporting a section of the force transmitting device on a side facing away from the sealant, wherein the sealant is disposed such that it at least partially overlaps a supporting region delimited by the mount in terms of its cross section. The preferred designs described with the proposed attachment mechanism can be combined thereby, either individually or as a whole, with the proposed shift device. In this manner, a shift device can be created, which can likewise reduce the oscillations or background noises transmitted from the engine compartment.

The shift device can, alternatively or in addition to the design described above, have the force transmitting element that can be forced into motion, wherein a blocking device for blocking the gearshift lever is disposed in a movement path of the force transmitting element that can be forced into motion, between the coupling point with the force transmitting device and a coupling point with the gearshift lever, wherein the blocking device is supported in a stationary manner by means of a mount connected to a gearshift lever housing of the gearshift lever device. The respective components listed with this proposed shift device can have a design such as that described above, individually or as a whole. The alternative shift device can likewise reduce the oscillation transmitted from the engine compartment into the motor vehicle interior space, and minimize the background noises associated therewith. As long as the shift device also has the force transmitting element that can be forced into motion and the blocking device, then this is a preferred embodiment of the shift device proposed in the introduction, by means of which a further improvement of the minimization of background noises can be achieved.

According to a further aspect of the present invention, a method is proposed for attaching a shift device to a motor vehicle component. The method for attaching the shift device comprises a step for attaching a gearshift lever device to an attachment mechanism, and a subsequent step for attaching the attachment mechanism to the motor vehicle component, with a sealant disposed therebetween. The gearshift lever device, the attachment mechanism, and the motor vehicle component can be designed in a manner described above.

The method is distinguished in that the method comprises a step for installing the gearshift lever device disposed prior to the step for attaching the gearshift lever, wherein the installation step comprises a step for the insertion of a force transmitting element that can be forced into motion by means of a gearshift lever, with a blocking device disposed in the movement path of the force transmitting element, in a gearshift lever housing part of the gearshift lever device, wherein the blocking device comprises at least one mounting plate supported by the gearshift lever housing part, and a subsequent step for assembling the gearshift lever housing. For this, both the force transmitting element as well as the blocking deice can be designed in the manner described above. A shift device can be created by means of this proposed method, which can minimize an oscillation transmitted from an engine compartment to a motor vehicle interior space via a force transmitting device.

Alternatively to the proposed method, or in addition thereto, the method is distinguished by a step for introducing a sealant between the attachment mechanism and the gearshift lever device in a region that at least partially overlaps a support region delimited by a mount in terms of its cross section, disposed prior to the attachment step for the attachment mechanism, and disposed subsequent to the attachment step for the gearshift lever device, wherein the mount is disposed for supporting a section of a force transmitting device connecting, in a shift-effecting manner, a gearshift lever device to a motor vehicle transmission, on a side of the attachment mechanism facing away from the sealant. The force transmitting device, as well as the casing element can be designed in a manner such as that described above. A shift device having the advantages described above can likewise be obtained by means of this alternative method. As long as the arrangement of the sealant also occurs as described above, this is a preferred embodiment of the method proposed in the introduction.

Further features and advantages of the invention can be derived from the following description of preferred exemplary embodiments of the invention, based on the Figures and drawings, which show details essential to the invention, and from the Claims. The individual features can each be realized in and of themselves, or in numerous arbitrary combinations thereof, in a preferred embodiment of the invention.

BRIEF DESCRIPTION OF THE DRAWINGS

Preferred exemplary embodiments of the invention shall be explained in greater detail below based on the attached drawings. Therein.

DETAILED DESCRIPTION OF THE PREFERRED EMBODIMENTS

In the following description of preferred exemplary embodiments of the present invention, the same or similar reference symbols shall be used for the elements having identical or similar functions, depicted in the various Figures, wherein there shall not be a detailed repetition of the description of these elements.

Figure 1:
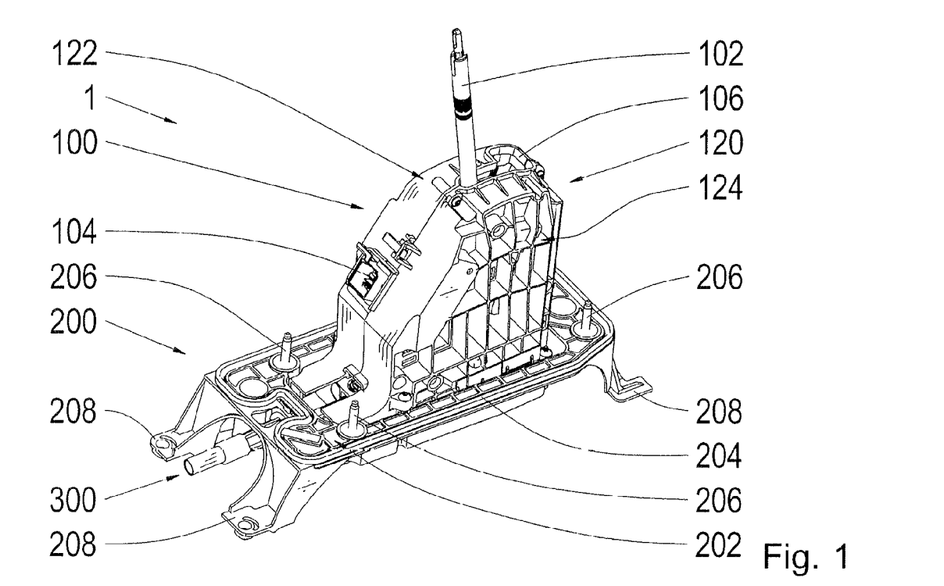
FIG. 1 shows a perspective view of a shift device according to a preferred exemplary embodiment.

FIG. 1 shows a perspective view of a shift device 1 according to a preferred exemplary embodiment. The shift device 1 comprises a gearshift lever device 100 and an attachment mechanism 200 that accommodates the gearshift lever device 100. The gearshift lever device 100 is connected in a shift-effecting manner to a, not shown, motor vehicle transmission device, via a force transmitting device 300, which is supported by the attachment mechanism 200. A shift-effecting connection, as set forth in the present invention, is understood to be such a connection, with which, by introducing a force into the gearshift lever device 100 via a gearshift lever 102, a transmission of the introduced force occurs via the force transmitting device 300, such that a shift actuation of this type can be executed in the motor vehicle transmission device, which corresponds to the drive position selected via the gearshift lever 102. A selectable drive position can be, for example, the drive positions that can be selected in an automatic transmission, or automatic unit, Park P, Neutral N, Reverse R, Drive, or forwards operation, respectively, D, or another drive position that shifts the motor vehicle transmission device. Instead of the gearshift lever 102, a possible selection of a drive position can be transmitted, via a pushbutton element or a rotational element, to the motor vehicle transmission device by means of an introduction of force from the force transmitting device 300. A combination having a shift-by-wire concept is also conceivable, in which a selection of predetermined selectable drive positions can occur by means of an electrical signal, and a selection of one or more other drive positions at the motor vehicle transmission device can occur by means of the force transmitting device 300. By way of example, a selection of the drive positions R, N, and D can be transmitted to the motor vehicle transmission device by means of a shift-by-wire assembly, while a selection of the drive position P occurs via the force transmitting device 300.

The gearshift lever device 100 comprises a gearshift lever housing 120, which is composed of two gearshift lever housing halves 122, 124. An installation plane for the gearshift lever housing 12 is congruent with a central plane, or plane of symmetry, respectively, of the gearshift lever housing 120. The first gearshift lever housing half 122 is nearly symmetrical to the second gearshift lever housing half 124. The first gearshift lever housing 122 differs substantially from the second gearshift lever housing 124 in that an aperture for an electrical plug-in connection 104, e.g. for connecting a drive position display device and a shift gate 106 for the gearshift lever 102, is formed in the first gearshift lever housing 122. The first and second gearshift lever housing halves 122, 124 are each produced from a material containing plastic, e.g. by means of a multi-component injection molding process.

The attachment mechanism 200 is made from a material containing plastic, by means, e.g., of a multi-component injection molding process, designed in the shape of a pan. The attachment mechanism 200 has a bearing surface section 202 on a side facing the gearshift lever device 100, for bearing on a bearing element 600, such as a motor vehicle component, or body component, e.g. a motor vehicle floor plate. The bearing surface section 202 delimits an aperture 201 for receiving the gearshift lever device 100. The aperture 201 is formed in the region of the pan-shaped section 220. The gearshift lever device 100 is received by the attachment mechanism 200 in the aperture 201 at an end section, wherein the received end section of the gearshift lever device 100 encompasses a free end of the gearshift lever 102. A sealant 204 is disposed in the bearing surface section 202, wherein the sealant 204 runs parallel to an outer edge of the attachment mechanism 200 inside the bearing surface 202 of the aperture for receiving the gearshift device 100, such that it encompasses it in its entirety. The sealant 204 is provided for bearing against the bearing element 600, in order to seal an exterior space surrounding the attachment mechanism 200 against an interior space surrounding the gearshift lever device 100, such as a motor vehicle interior space.

Furthermore, numerous attachment bars 206 are disposed in the bearing surface section 202, which extend through the bearing element 600, and serve to attach a cover panel encompassing the gearshift lever device 100 in the motor vehicle interior space. The attachment mechanism 200 furthermore has, outside the pan-shaped section 220, which receives the gearshift lever device 100, numerous attachment elements 208 for attachment to the bearing element. The attachment of the attachment mechanism 200 can occur by means of a screw connection, a latching connection, or a clamping connection, wherein the attachment element 208 is designed accordingly.

Figure 2:
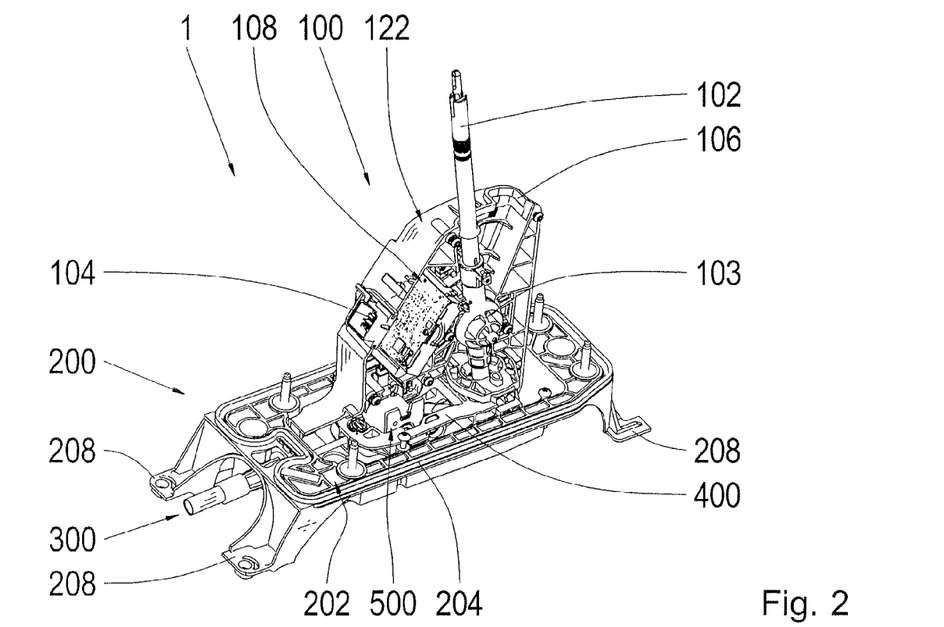
FIG. 2 shows a perspective view of the shift device shown in FIG. 1, having a view into a gearshift lever housing.

FIG. 2 shows a perspective view of the shift device 1 shown in FIG. 1, in a partially disassembled state of the gearshift lever device 100. In detail, FIG. 2 shows the arrangement of further components of the gearshift lever device 100 in the gearshift lever housing 120, such as an electronics unit 108 that interacts with the gearshift lever 102, a gearshift lever ball joint bearing 103, a force transmitting element 400, and a blocking element 500. Features that are substantial to the invention shall be explained in greater detail below in reference to the other Figures.

Figure 3:
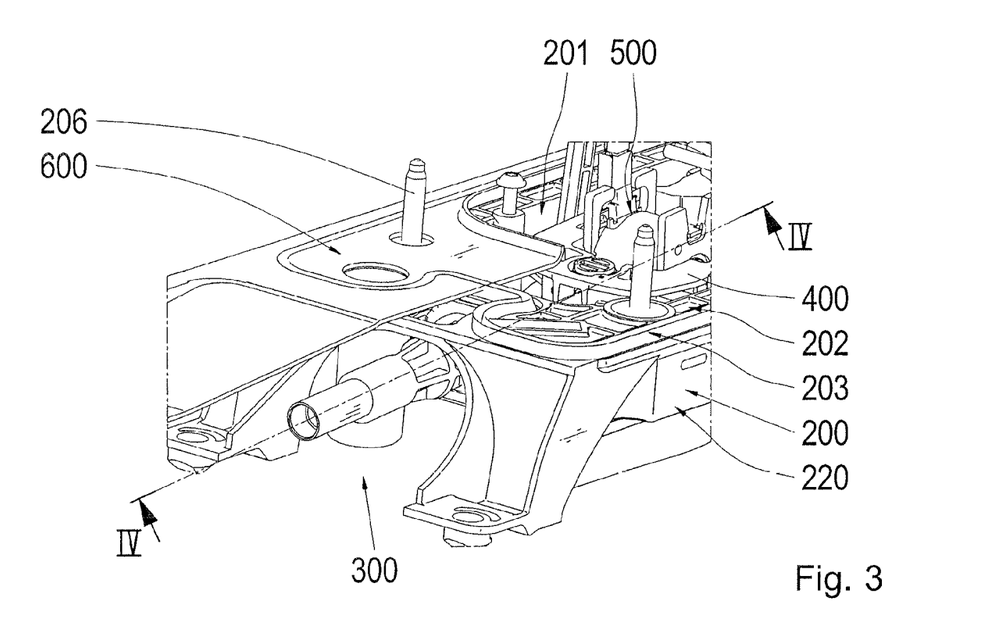
FIG. 3 shows a perspective excerpt enlargement of the shift device shown in FIG. 1, at the location of a mount for a force transmitting device.
Figure 4:
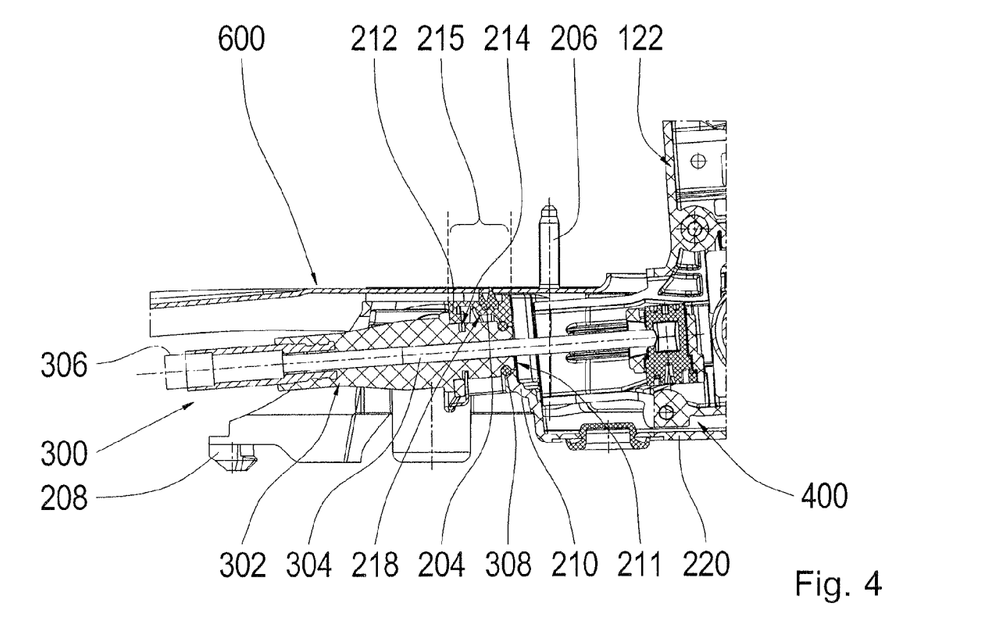
FIG. 4 shows a schematic sectional view of the perspective excerpt enlargement shown in FIG. 3, along the cut line IV-IV.

FIG. 3 shows a perspective excerpt enlargement of the shift device 1 shown in FIGS. 1 and 2, at the location of a mount for the force transmitting device 300. FIG. 4 shows a sectional view of the perspective excerpt enlargement shown in FIG. 3, along the cut line IV-IV. As depicted, in particular, in FIG. 3, the bearing surface section 202 has a sealant receiver 204 for receiving the sealant 204. The sealant receiver 203 is implemented by means of a cavity formed in the bearing surface section 202, wherein the cavity encompasses a central rib 205 for enlarging a surface area of the sealant receiver 203. As a result, an adhesion of the sealant 204 in the sealant receiver 203 is improved.

FIG. 4 shows, in particular, a mount 210, 212, 214 for the force transmitting device 300 on the attachment mechanism 200, as well as a course of the sealant receiver 203, or the sealant 204 in a support region 215 of the attachment mechanism 200 delimited by the mount 210, 212, 214. In detail, the force transmitting device 300 in this preferred exemplary embodiment is designed as a cable pull device, wherein the cable pull device 300 comprises a casing element 302 in the form of a cable pull counter bearing on its longitudinal end facing the shift device 1, which encases a cable pull core 304 that can move in relation to the cable pull counter bearing 302, and is connected and secured to a cable pull casing 306, that entirely encompasses the cable pull core 304 in a protective manner in a region from the shift device 1 to the, not shown, motor vehicle transmission device.

The cable pull counter bearing 302 is supported in a stationary manner by the mount 210, 212, 214, comprising a first mount element 210 and a second mount element 212. In detail, the first mount element 210 is formed by a wall section region of the pan-shaped section 220 facing the force transmitting device 300, wherein the facing wall section region comprises a support aperture 211, which receives a front end of the cable pull counter bearing 302 such that it makes contact therewith. The front end of the cable pull counter bearing 211 is encompassed by a sealing ring, which bears in a sealing manner on the wall section region of the pan-shaped section 220 of the attachment mechanism 200 encompassing the support aperture 211. As a result, a sealing of the exterior space encompassing the attachment mechanism 200 against the receiving space of the attachment mechanism 200 is ensured.

A collar 218 extending outward from the pan-shaped section 220 is disposed in a wall section region of the pan-shaped section 220 facing toward the bearing surface section 202 from the mount aperture 211, which collar is formed as an integral part of the attachment mechanism 200. Outward, or on the outside, as set forth in the present invention, corresponds to a region that lies on the side of the attachment mechanism 200 facing away from the receiver aperture 201. The collar 218 exhibits the bearing surface section 202 with the sealant receiver 203 and the sealant 204 received therein on a side facing toward the bearing element 600. The collar 318 furthermore extends from its free end, which is spaced apart from the first support element 210, in the opposite direction to its upper surface, having the bearding surface section 201 and the sealant receiver 203, and parallel to, or nearly parallel to, the hole plane formed by the mount aperture 211. The collar 218 has a hole in this this extension section, having a further hole plane running parallel to, or nearly parallel to the hole plane of the mount aperture 211, through which the front end of the cable pull counter bearing 302 extends as far as the mount aperture 211. Nearly parallel, as set forth in the present invention, corresponds to a course that is not precisely parallel to a reference line, reference surface or reference plane, wherein the scope of the deviation to the precise parallelism forms an acceptable tolerance for executing the desired effect. Concretely, this means that the further hole plane of the hole can have such a deviation in its parallelism to the hole plane of the mount aperture 211, that it still allows for an insertion of the cable pull counter bearing 302 through the hole, as far as the mount aperture 211.

The extension section of the collar 218 encompassing the hole forms the second support element 212, wherein the first support element 210 and the second support element 212 are connected to one another via the section of the collar 218 comprising the bearing surface section 202 and the sealant receiver 203. The outer surfaces of the first and second support elements 210, 212 facing away from the respective other support elements 210, 212 define or delimit a support region 215 running toward the first and second support elements 210, 212. The size of the support region 215 in this direction corresponds to the straight line distance between the outer sides of the first and second support elements.

The cable pull counter bearing 302 has a flange section designed accordingly, for bearing on the second support element 212. On a side of the second support element 212 facing away from the flange section, the cable pull counter bearing 302 is fixed in place, in a stationary manner, by means of a clamp 214. In other words, the cable pull counter bearing 302 is secured on the attachment mechanism 200 by means of the first and second support elements 210, 212 in the direction of the action of force of the force transmitting device 300, as well as at an angle thereto, by means of which a coupling point is formed between the force transmitting device 300 and the attachment mechanism 200 in the region of the mount 210, 212, 214.

This coupling point simultaneously forms a transmission point for an oscillation transmitted from an engine compartment via the force transmitting device 300.

Because the sealant 204 is disposed, preferably at least partially overlapping the support region 214 delimited by the first support element 210 and the second support element 212, or alternatively, as depicted in FIG. 4, it is particularly preferred that the sealant 204, in its width, is fully inside the support region 215, or furthermore alternatively, it preferably entirely overlaps the support region 215, the bearing element 600 can act directly on the coupling point as an oscillation buffer for reducing the oscillation transmitted by the force transmitting device 300. As a result, system noises in the motor vehicle interior space can be noticeably reduced.

Figure 5:
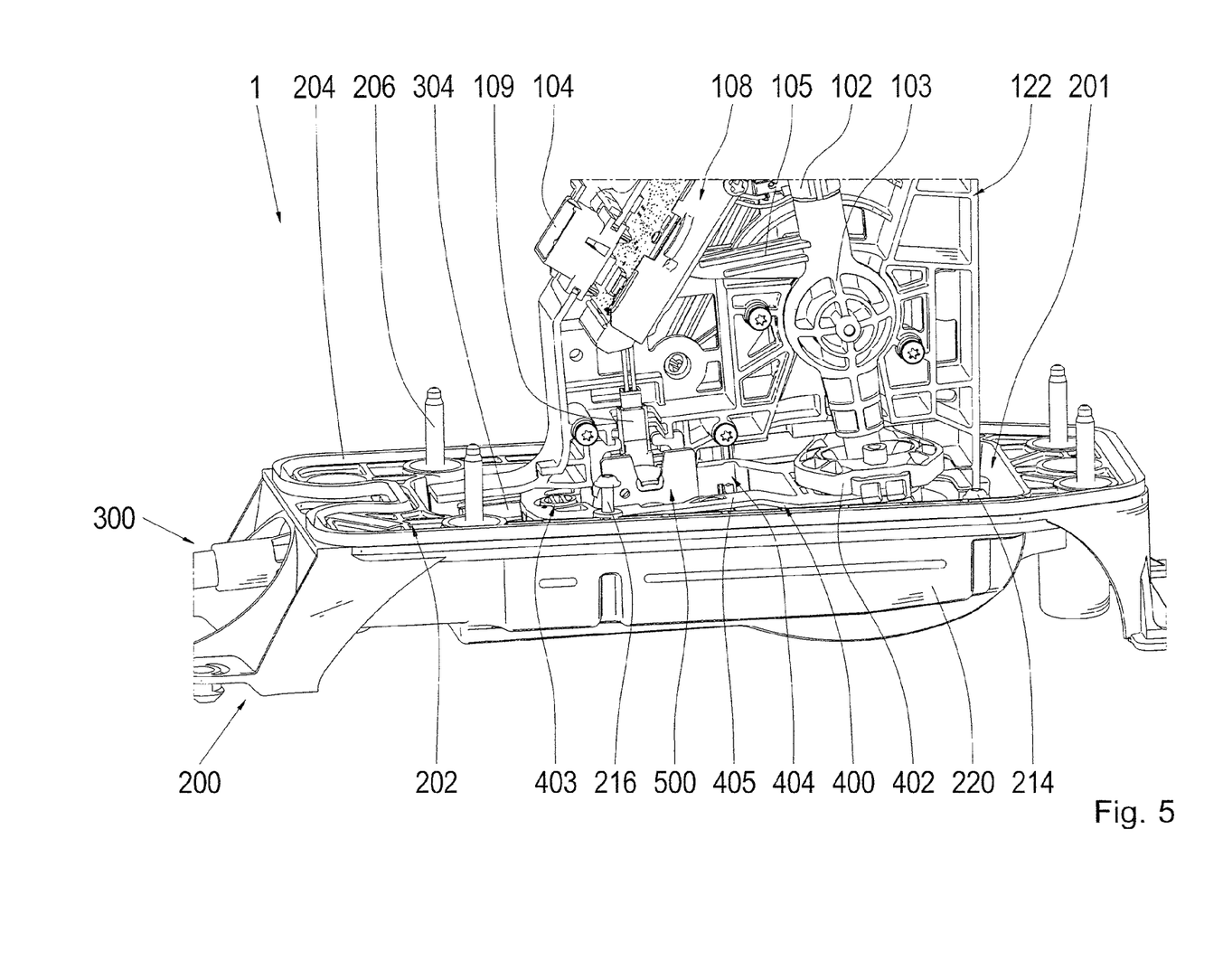
FIG. 5 shows a perspective side view of the shift device shown in FIG. 2.
Figure 6:
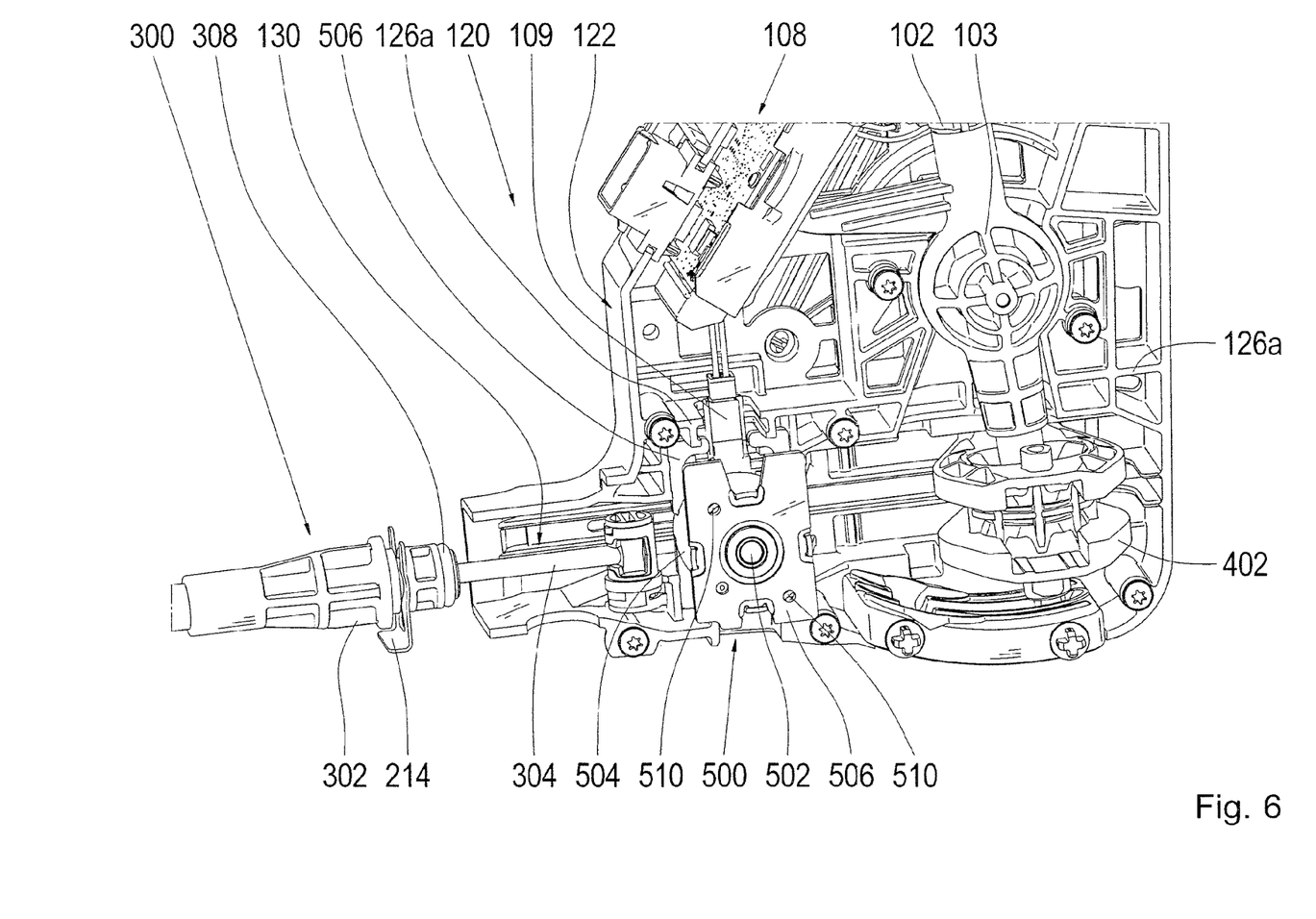
FIG. 6 shows a perspective side view of the shift device shown in FIG. 5, without an attachment mechanism and force transmitting device.
Figure 7:
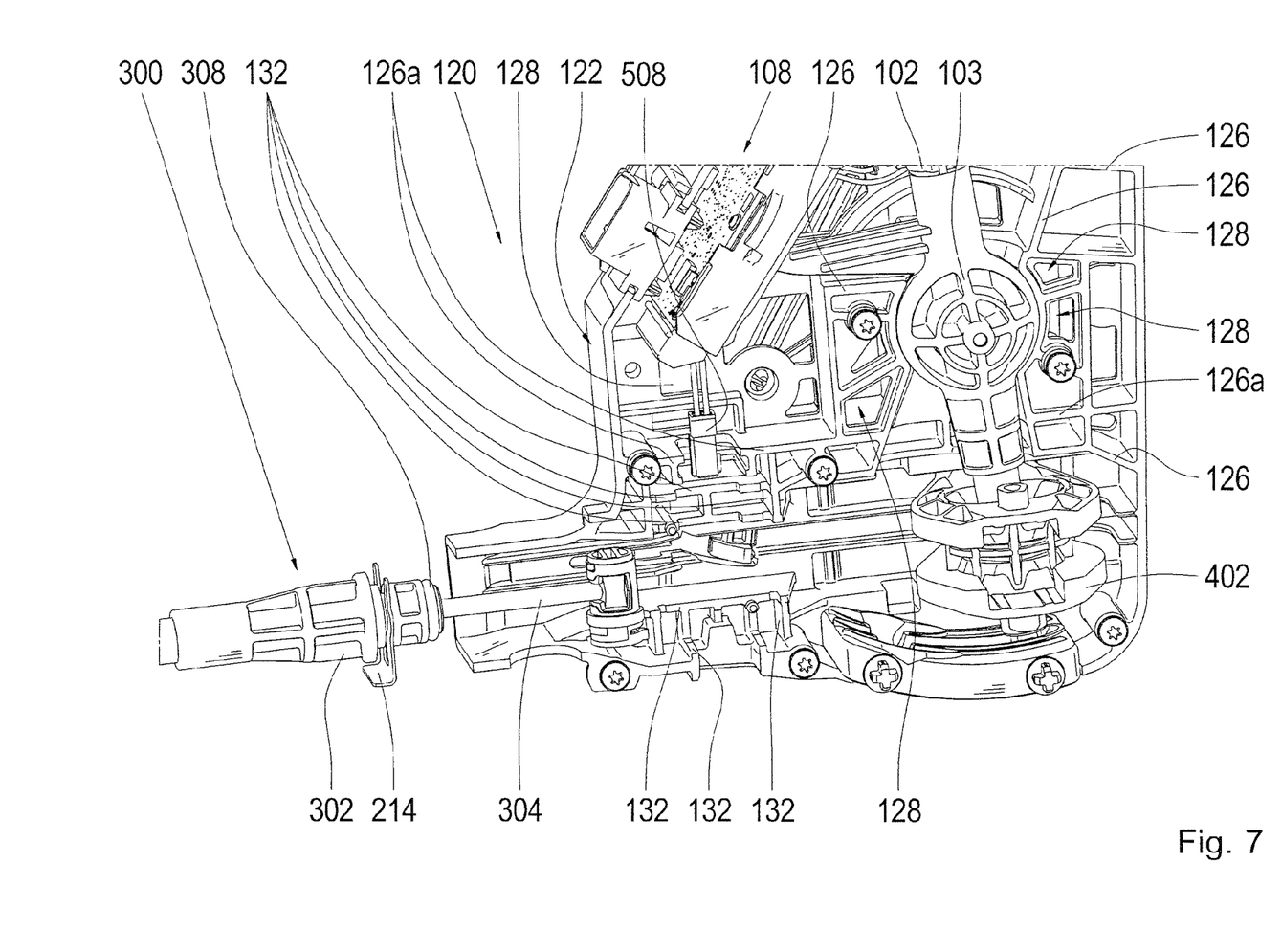
FIG. 7 shows a perspective side view of the shift device shown in FIG. 6, without a blocking device.

FIGS. 5 to 7 show a perspective side view of the preferred exemplary embodiment shown in FIG. 2, with details regarding further measures for reducing an oscillation transmitted from an engine compartment into a motor vehicle interior space by means of a force transmitting device lying therebetween.

FIG. 5 shows, among other things, the pan-shaped design of the attachment mechanism 200. The attachment mechanism 200 furthermore has numerous screw attachments 216 disposed along the bearing surface section 202, for securing the attachment mechanism 200 to the bearing element 600.

FIG. 5 furthermore shows the arrangement of the force transmitting element 400 in the gearshift lever housing 120 in a region of the receiving aperture 201. The force transmitting element 400 is made of a material containing plastic, e.g., produced by means of a multi-component injection molding process. The force transmitting element 400 is permanently coupled at one end to the gearshift lever 102. For this, the force transmitting element 400 has a gearshift lever section receiver on the one end, through which a gearshift lever section, which extends between the ball joint bearing 103 and a free end of the gearshift lever 102 received in the gearshift lever housing 120, extends. For this, a receiving element 402 disposed in the one end of the force transmitting element 400 is provided, which has an hour glass cross section, in order to ensure that the force transmitting element 400 moves in a linear direction, corresponding to the movement of the gearshift lever 102.

On the other end of the force transmitting element 400, lying opposite the one end, a receiver 403 is provided for securing a longitudinal end of the cable pull core 304 to the force transmitting element 400. The force transmitting element 400 extends from the one end, having the gearshift lever receiver element 402, to the other end, having the receiver 403 for the longitudinal end of the cable pull core 304, in a frame-like manner, with a cavity 404 lying therebetween for receiving a blocking device 500. The cavity 404 is large enough that the force transmitting element 400 can move in relation to the blocking device 500, which is supported in a stationary manner in the gearshift lever housing 120, as shall be described in detail below. The cavity 404 is furthermore designed such that the force transmitting element 400 comes to bear on the blocking device 500 when the gearshift lever 102 is in its respective end positions, by means of which the frame 405 of the force transmitting element 400 delimiting the cavity 404 defines an end stop in the direction of movement, when the gearshift lever 102 is in the respective end positions. The frame 405 has a guide in the form of a tongue and groove system on a side of the force transmitting element 400 facing away from the cavity 404, for a sliding guidance inside the gearshift lever housing 120. As is shown, in particular, in FIG. 6, the gearshift lever housing 120, or the respective gearshift housing halves 122, 124, respectively, has a counter-guidance element 130 in the form of a groove running in the direction of the action of force for the force transmitting element 300. The groove 130 engages with a tongue, not shown, formed with the force transmitting element 400, for a sliding linear guidance of the force transmitting element 400 inside the gearshift lever housing 120. Stops, or end stops, respectively, for a gearshift lever movement, are defined by means of the guide, or the tongue and groove system, respectively, between the force transmitting element 400 and the gearshift lever housing 120, by corresponding stops provided along the guide.

FIG. 6 shows an arrangement of the blocking device 600 in the gearshift lever housing 120 according to a preferred exemplary embodiment. The blocking device 500 is an electromagnetic actuator having a sleeve-like body 504, which is bordered at the ends by support plates 506. A retractable and extendable blocking pin 502 is disposed at one of the end surfaces of the sleeve-like body 504 of the blocking device 500, which can be retracted into and extended from the sleeve-like mechanism, unimpaired, through an aperture in the support plate 506 disposed at the end surface, such that it can move back and forth. In FIG. 6, the blocking pin 502 is depicted in a retracted, inactive state of the blocking device 500. The blocking device 500 has an electrical connection 109 to the electronics unit 108, wherein the electronics unit 108 is configured for controlling the blocking device 500 appropriately. In other words, the blocking pin 502 is retracted and extended by means of a shifting signal emitted by the electronics unit 108. The extended state of the blocking pin 502 corresponds to an activated state of the blocking device 500, with which a movement of the force transmitting element 400, and thus the gearshift lever 102, is blocked. For this, the frame 405 has at least one, not shown, blocking recess on a side lying opposite the blocking pin 502, in which the blocking pin 502 can engage in order to block a movement of the force transmitting element 400, when in the extended state. The at least one blocking recess is provided at a position in the frame 405, which corresponds to a gearshift lever position that is to be locked in place. By way of example, the blocking recess can be disposed such that the gearshift lever 102 can be locked in a gearshift lever position corresponding to a selected drive position by means of the blocking device 500. Preferably, correspondingly assigned blocking recesses are provided in the frame 405 for at least two gearshift lever positions corresponding to selected drive positions.

Each of the support plates 506 are supported by a gearshift lever housing half 122, 124. For this, each of the gearshift lever housing halves 122, 124 have a support device 130 having support elements 132, wherein the support elements 132 in this preferred exemplary embodiment are formed by reinforcement ribs in the respective gearshift lever housing halves 122, 124. Individually, each of the support plates 506 are supported in the corresponding gearshift lever housing halves 122, 124 by means of the support elements 132, in a clamping manner. For this, the reinforcement ribs formed as support elements 132 are disposed in the respective gearshift lever housing halves 122, 124, such that they come to bear on an outer circumference of the respective support plate 506, in order to secure the respective support plate 506 in at least one direction along the support plate plane, in a stationary manner. For this, the support elements 132 are disposed lying opposite one another. The reinforcement ribs 132, formed as support elements, come to bear thereby on the corresponding support plate 506, at a free end surface or at a lateral surface, depending on the location thereof in the respective gearshift lever housing half 122, 124. For a further stabilization of the respective support plate 506 in the corresponding gearshift lever housing half 122, 124, each of the gearshift lever housing halves 122, 124 has one or more support pins 134, which extend from an inner surface of the gearshift lever housing half of the respective gearshift lever housing half 122, 124 toward the corresponding support plate 506, and engage in an assigned support plate hole 510 formed in the support plate 506. The support plate holes 510 are formed as apertures in the support plate 506 in this preferred exemplary embodiment. Alternatively, or additionally, at least one support plate hole 510 can be formed as a recess in the facing surface of the respective support plate 506, for engaging with the assigned support pin 134.

The arrangement of the blocking device 500, having support plates 506 supported by the gearshift lever housing halves 122, 124 enables a further reduction of the oscillations transmitted from the engine compartment via the force transmitting device 300 to the shift device 1. In detail, the massive blocking device 500 acts as a buffer for the oscillations transmitted by the force transmitting device 300, by means of the arrangement thereof in the region of the end section of the force transmitting device 300 in conjunction with the support in the gearshift lever housing 120 achieved via the support plates 506. By supplementing this with the arrangement of a sealant at the coupling point of the force transmitting device 300 to the attachment mechanism 200 and the bearing element 600, described above, a further reduction of the transmitted oscillation, and thus a minimization of the system noises in the motor vehicle interior space, can be achieved.

As described above, FIGS. 5 to 7 show a preferred exemplary embodiment of a gearshift lever housing 120, comprising a first gearshift lever housing half 122 and a second gearshift lever housing half 124. Each of the gearshift lever housing halves 122, 124 has numerous reinforcement ribs 126 on an inner surface of the gearshift lever housing half. The reinforcement ribs 126 extend toward one another at different heights, extending away from the respective inner surface of the gearshift lever housing half, and thus form different receiving spaces for corresponding components of the shift device 1. By way of example, a receiving space for the force transmitting element 400, which is coupled to the force transmitting device 300 as well as the gearshift lever 102, and accommodates the blocking device 500, is created by means of the reinforcement ribs 126. For this, a central reinforcement rib 126a is provided, which extends parallel to, or nearly parallel to, the movement direction of the force transmitting element 400 from a gearshift lever housing side of the gearshift lever housing 120 to an opposite gearshift lever housing side, wherein the central reinforcement rib 126a only has holes, or apertures, respectively, through which the electrical connection 109 as well as the gearshift lever section of the gearshift lever 102 extending to the force transmitting element 400 pass. The location of the central reinforcement rib 126a is selected such that they can be provided for supporting the support plates 506 of the support elements 132, which preferably likewise form a reinforcement rib, and are connected to the central reinforcement rib 126a. In this preferred exemplary embodiment, the central reinforcement rib is formed as an integral part of the first gearshift lever housing half 122. In this context, it should be noted that the central reinforcement rib 126a formed in the second gearshift lever housing half 124 is formed at a position that comes in contact with a front surface of the central reinforcement rib 126a of the first gearshift lever housing half 122, wherein it is not necessary that there be a hole provided for the electrical connection 109 in the second gearshift lever housing half 124. For a more cost-effective production of the first and second gearshift lever housing halves 122, 124, it is preferred, however, that the first and second gearshift lever housing halves 122, 124 are symmetrical, because only one tool need be provided for this.

The design of the first and second gearshift lever housing halves 122, 124 having numerous reinforcement ribs 126 has the advantage that the surface, otherwise functioning as a diaphragm, of the first and second gearshift lever housing halves 122, 124, is made more stable, and as a result, exhibits less of a diaphragm-like characteristic. As a result, the transmitted oscillations, or system noises, can be further minimized in the motor vehicle interior space.

For a further weakening of the diaphragm-like characteristics of the respective first and second gearshift lever housing halves 122, 124, each of the first and second gearshift lever housing halves 122, 124 has one or more perforations 128. Each of the perforations 128 is designed such that an encompassing edge of the perforation 128 is spaced apart from an adjacent reinforcement rib 126. In other words, none of the reinforcement ribs 126 borders directly on a perforation 128, such that a lateral surface of the reinforcement rib 126 forms an edge bordering on the perforation 128. This furthermore increases stability of the respective first and second gearshift lever housing halves 122, 124, and has a positive effect on the weakening of the diaphragm-like characteristic of the respective first and second gearshift lever housing halves 122, 124.

Figure 8:
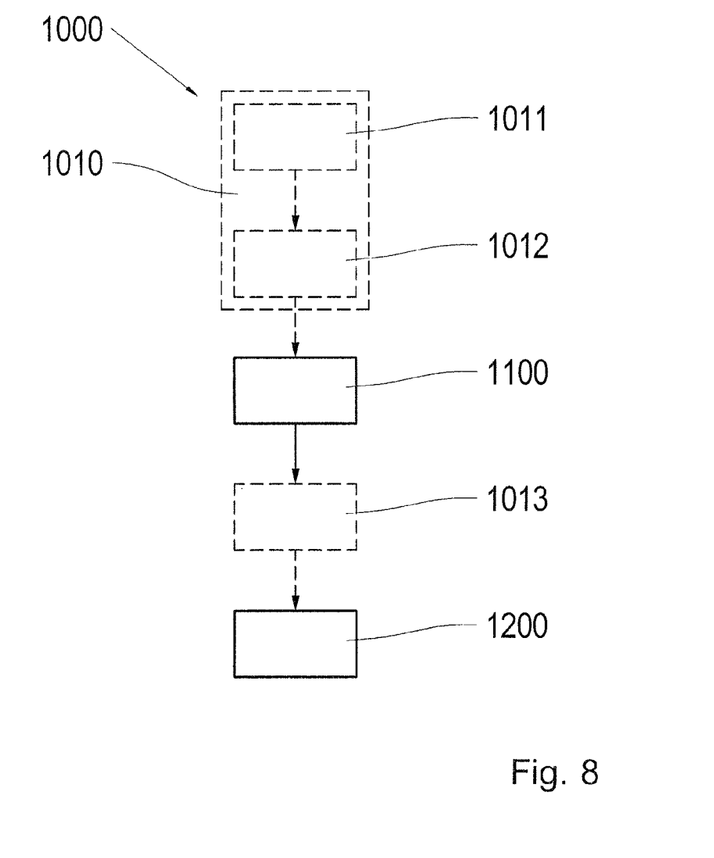
FIG. 8 shows a flow chart for a method for attaching a shift device to a motor vehicle component, according to a preferred exemplary embodiment.

FIG. 8 shows a flow chart for a method 1000 for attaching a shift device to a motor vehicle component, according to a first and second preferred exemplary embodiment. According to the first exemplary embodiment, the method 1000 comprises a step 1100 for attaching a gearshift lever device to an attachment mechanism and a subsequent step 1200 for attaching the attachment mechanism to the motor vehicle component, with a sealant placed therebetween. The gearshift lever device, the attachment mechanism, the motor vehicle component, and the sealant are, preferably, the corresponding components described above, in accordance with the preferred exemplary embodiment. The method 1000 is distinguished in that the method comprises a step 1013 for introducing a sealant between the attachment mechanism and the gearshift lever device in a region that at least, in terms of its cross section, partially overlaps a support region delimited by a mount, which step is inserted prior to the attachment step 1200 for the attachment mechanism, wherein the mount is disposed on a side of the attachment mechanism facing away from the sealant for supporting a section of a force transmitting device connecting the gearshift lever device to a motor vehicle transmission in a manner effecting a shift.

According to the second preferred exemplary embodiment, the method 1000 has the aforementioned method step 1100 for attaching a gearshift lever device to an attachment mechanism, as well as the subsequent method step 1200 for attaching the attachment mechanism to the motor vehicle component, with a sealant placed therebetween, wherein the method 1000 comprises a step 1010 for installing the gearshift lever device, placed prior to the attachment step 1100 for the gearshift lever device, wherein the installation step 1010 comprises a step for inserting a force transmitting element on which movement is imposed via a gearshift lever, having a blocking device disposed in the movement path of the force transmitting element in a gearshift lever housing part of the gearshift lever housing device, wherein the blocking device comprises at least one support plate supported by the gearshift lever housing part, and a subsequent step 1012 for assembling the gearshift lever housing. The aforementioned components are preferably corresponding components, described above, according to the preferred exemplary embodiment. With this method, it is likewise possible to reduce the oscillation transmission from the engine compartment to the shift device in a motor vehicle interior space, or to minimize the system noises from the engine compartment occurring in the motor vehicle interior space. In order to further improve a minimization of the oscillation, or a reduction of the system noises, the methods according to the first and second preferred exemplary embodiments can be combined to form a single method.

The exemplary embodiments described herein and show in the Figures are selected only by means of example. Different exemplary embodiments can be combined with one another, in their entirety, or with respect to individual features. Furthermore, one exemplary embodiment can be supplemented by one or more features of another exemplary embodiment. The dimensions of the geometric shape of the elements described herein are only exemplary, and can be adjusted accordingly.

REFERENCE SYMBOLS 1 shift device
100 gearshift lever device
102 gearshift lever
103 ball joint bearing
104 electrical plug-in connection
106 shift gate
108 electronics unit
109 electrical connection
120 gearshift lever housing
122 first gearshift lever housing half
124 second gearshift lever housing half
126 reinforcement rib
128 perforation
130 support device
132 support element
134 support pin
200 attachment mechanism
201 receiving aperture
202 bearing surface section
203 sealant receiver
204 sealant
205 sealant receiver rib
206 attachment bar
208 attachment element
210 first support element
211 mount aperture
212 second support element
214 clamp
215 support region
216 screw connection
218 collar
220 pan-shaped section
300 force transmitting device
302 cable pull counter bearing
304 cable pull core
306 cable core casing
308 sealing ring
400 force transmitting element
402 receiving element
404 cavity
405 frame
500 blocking device
502 blocking pin
504 sleeve-like blocking body
506 support plate
510 support plate recess/hole
600 bearing element
1000 method
1010 installation step
1011 insertion step
1012 assembly step
1013 introduction step
1100 first attachment step
1200 second attachment step

What is claimed is:
1. An attachment device for a gearshift lever device comprising:

an aperture for receiving the gearshift lever device;
a bearing surface section that at least partially encompasses the aperture, for bearing on a bearing element;
a sealant receiver disposed in the bearing surface section; and
a mount for supporting a section of a force transmitting device connecting in a shift-effecting manner the gearshift lever device to a motor vehicle transmission device;
wherein the mount is disposed on a side of the bearing surface section facing away from the sealant receiver;
wherein the sealant receiver at least partially overlaps, in terms of its cross section, a support region delimited by the mount;
wherein the mount is formed by at least two mount sections spaced apart from one another in the direction of the action of force for the force transmitting device; and
wherein at least one collar, which comprises or forms a part of the bearing surface section having the sealant receiver on one side of the collar, and supports at least one of the mount sections on a side of the collar facing away therefrom.

2. The attachment device of claim 1, wherein the sealant receiver is formed by a cavity formed in the bearing surface section.

3. The attachment device of claim 1, wherein the attachment device further comprises a hard plastic component and a soft plastic component, wherein at least the mount comprises the soft plastic component.

4. The attachment device of claim 1, wherein the force transmitting device comprises at least one guide element that can engage in a counter-guidance element formed in the gearshift lever device, for guiding a linear movement of the force transmitting element in relation to the gearshift lever device; a gearshift lever receiver for receiving a section of a gearshift lever that imposes movement on the force transmitting element; and a receiver for a longitudinal end of the force transmitting device leading to a motor vehicle transmission device, for transmitting the force imposed by the gearshift lever section on the force transmitting device;
wherein the gearshift lever receiver and the receiver for the longitudinal end can be connected to one another via a frame;
wherein the frame supports the at least one guide element;
wherein the frame has a cavity between the gearshift lever receiver and the receiver for the longitudinal end, for a blocking device having at least one blocking element that can move at an angle to the linear movement of the force transmitting element, and at least one engagement element that at least partially encompasses the moving blocking element, for engaging in a gearshift lever housing of the gearshift lever device;
wherein the cavity allows for a movement of the frame in relation to the blocking device; and
wherein the frame has at least one blocking recess that can be brought into engagement with the blocking element, for blocking the linear movement of the force transmitting element.

5. The attachment device of claim 2, wherein the mount is formed by at least two mount sections spaced apart from one another in the direction of the action of force for the force transmitting device.

6. The attachment device of claim 2, wherein the attachment device further comprises a hard plastic component and a soft plastic component, wherein at least the mount comprises the soft plastic component.

7. The attachment device of claim 1, wherein the attachment device further comprises a hard plastic component and a soft plastic component, wherein at least the mount comprises the soft plastic component.

8. An attachment device for a gearshift lever device comprising:
an aperture for receiving the gearshift lever device;
a bearing surface section that at least partially encompasses the aperture, for bearing on a bearing element;
a sealant receiver disposed in the bearing surface section; and
a mount for supporting a section of a force transmitting device connecting in a shift-effecting manner the gearshift lever device to a motor vehicle transmission device;
wherein the mount is disposed on a side of the bearing surface section facing away from the sealant receiver;
wherein the sealant receiver at least partially overlaps, in terms of its cross section, a support region delimited by the mount;
wherein the force transmitting device comprises at least one guide element that can engage in a counter-guidance element formed in the gearshift lever device, for guiding a linear movement of the force transmitting element in relation to the gearshift lever device; a gearshift lever receiver for receiving a section of a gearshift lever that imposes movement on the force transmitting element; and a receiver for a longitudinal end of the force transmitting device leading to a motor vehicle transmission device, for transmitting the force imposed by the gearshift lever section on the force transmitting device;
wherein the gearshift lever receiver and the receiver for the longitudinal end can be connected to one another via a frame;
wherein the frame supports the at least one guide element;
wherein the frame has a cavity between the gearshift lever receiver and the receiver for the longitudinal end, for a blocking device having at least one blocking element that can move at an angle to the linear movement of the force transmitting element, and at least one engagement element that at least partially encompasses the moving blocking element, for engaging in a gearshift lever housing of the gearshift lever device;
wherein the cavity allows for a movement of the frame in relation to the blocking device; and
wherein the frame has at least one blocking recess that can be brought into engagement with the blocking element, for blocking the linear movement of the force transmitting element.

* * * * *